Nov. 16, 1965 R. H. BERG 3,217,889
FILTER
Filed Dec. 27, 1962 4 Sheets-Sheet 3
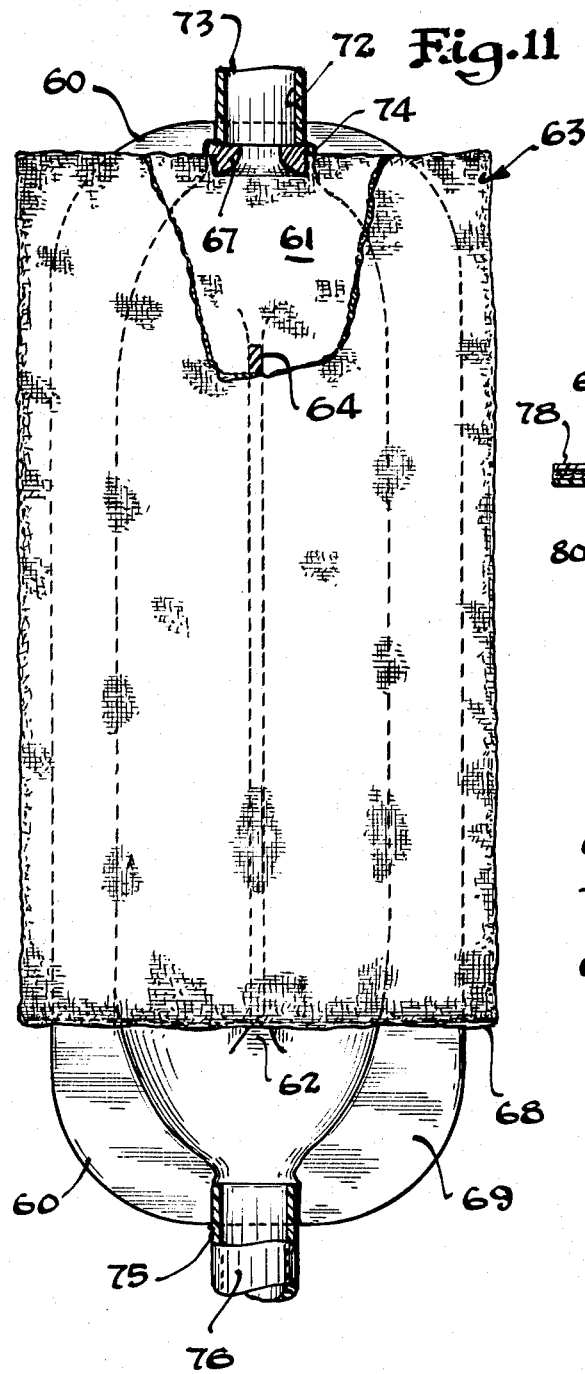
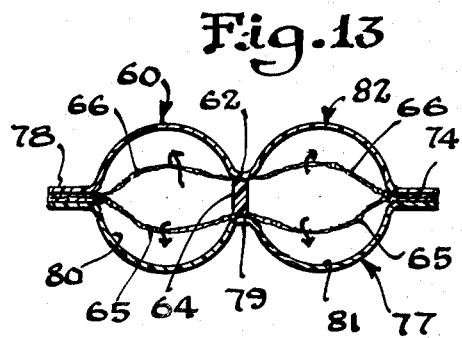
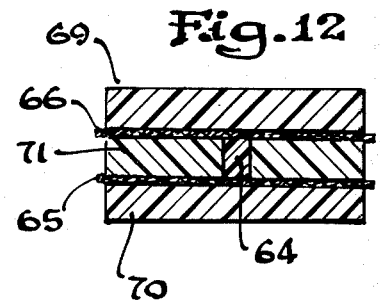
Inventor
Robert H. Berg
By Neil E. Hamilton
Attorney Nov. 16, 1965  R. H. BERG  3,217,889
FILTER
Filed Dec. 27, 1962  4 Sheets-Sheet 4
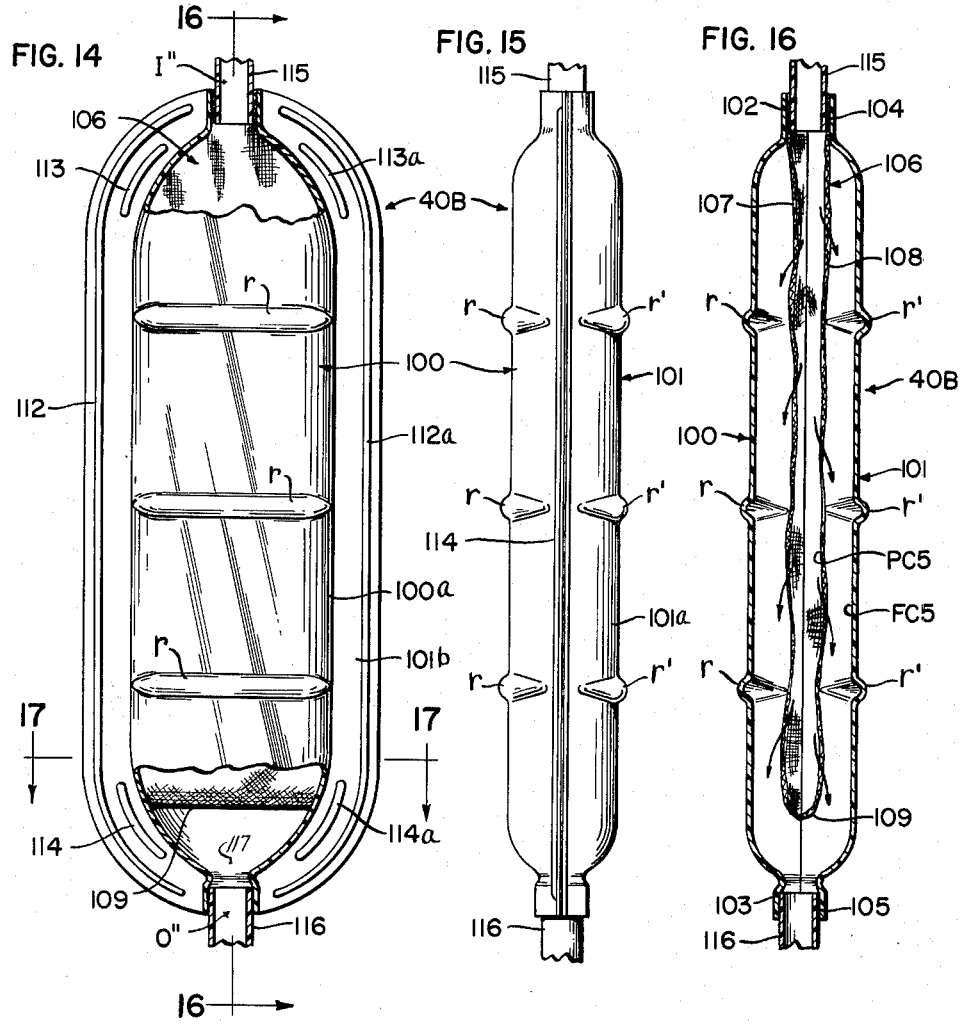
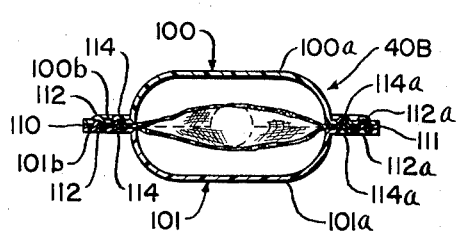
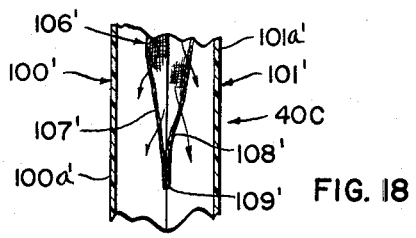
INVENTOR
ROBERT H. BERG
BY Joseph J. Grass
ATTORNEY United States Patent Office 3,217,889
Patented Nov. 16, 1965

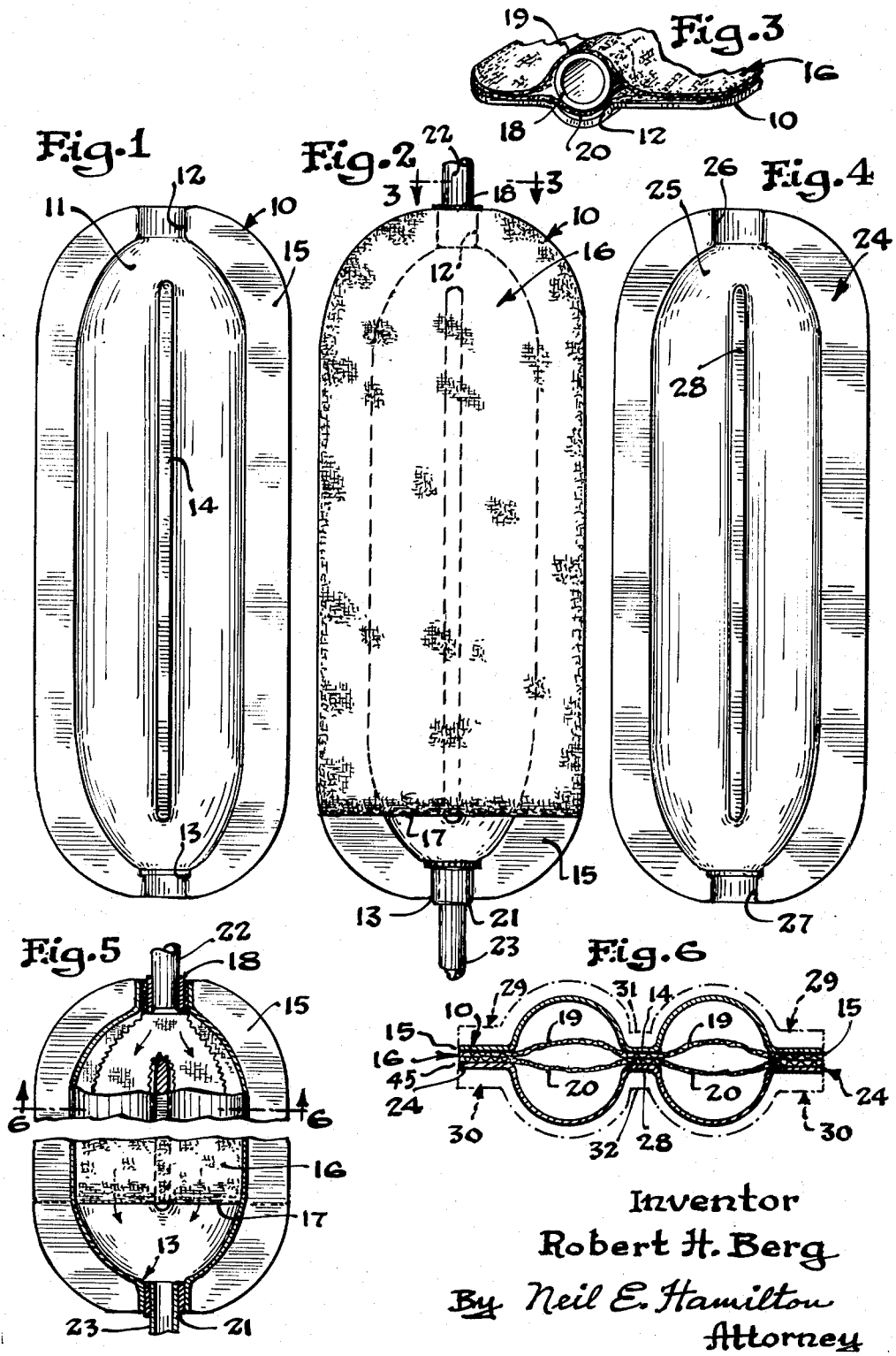

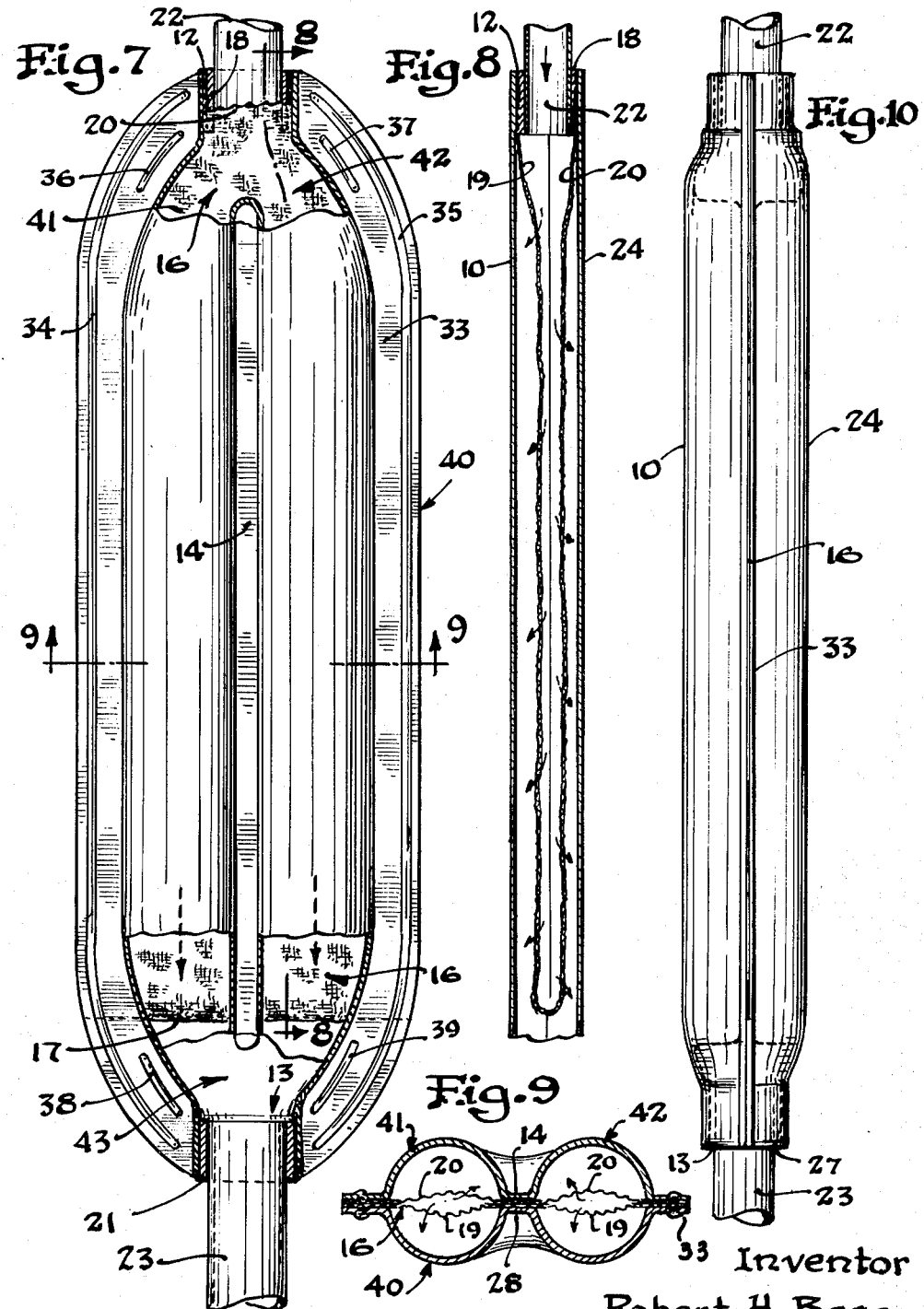

1

3,217,889
FILTER
Robert H. Berg, Antioch, Ill., assignor to Abbott Laboratories, North Chicago, Ill., a corporation of Illinois
Filed Dec. 27, 1962, Ser. No. 247,724
5 Claims. (Cl. 210—448)

This application is a continuation-in-part of my copending application S.N. 36,829 filed June 17, 1960, which is now abandoned.

This invention relates to an improved filter for filtering parenteral liquids. More particularly, the invention relates to a disposable filter for filtering blood outside the body.

The administration or handling of parenteral liquids poses many problems. One such problem is encountered in the handling of blood, which for various reasons, must be filtered before it is allowed to enter the circulatory system of the body. To provide effective filtration, a filter must not only remove clots and fibrins as well as foreign matter, but it must perform the filtering process in such a manner that the cell structure of the blood is not altered. In other words, the blood must be handled in as gentle a manner as possible.

Through this invention, a filter is provided which is particularly adapted to be employed in conjunction with an artificial lung device used for oxygenating blood in an extra corporeal manner. When a filter is so employed, it must be capable of handling large amounts of blood at a fast rate. This is necessary in order that a large volume of blood need not be employed. A filter must also perform its function without altering the cell structure of the blood. Further, it must also be capable of sterilization.

Many blood filters presently on the open market are composed of a cylindrical body section having a cylindrical metal screen which is crimped at one end to form an end closure wall. Such filters are not only cumbersome to manufacture and unsuitable for mass production, but result in filters having an end wall of solid metal which obstructs the flow of blood and prevents the smooth passage of blood therethrough. Such an obstruction results in damage to the cell structure when the flow rate of blood thereagainst is high. Other filters commonly employed that do not have metallic screens are either easily torn when a high flow of blood is passed therethrough or have a tendency to "balloon" to such an extent that a large volume of blood accumulates within the filter. This undesirable accumulation not only necessitates the use of a large volume of blood but also results in damage to the cell structure.

An object of the present invention is to provide an improved filter which utilizes a relatively small volume of blood and permits a smooth passage of blood therethrough.

A further object of the present invention is to provide a filter of the foregoing type which is capable of a high rate of blood flow with a minimum of damage to the cell structure of the blood.

A still further object of the present invention is to provide an improved plastic filter, which will not tear or become disassociated when the filter is subjected to a high rate of blood flow.

Another object of the present invention is to provide an improved plastic filter wherein the method is especially suitable for mass production; the method in other respects is especially desirable for producing blood filters as well as related applications.

Other objects of the invention will be apparent from the detailed description and claims to follow when taken in conjunction with the accompanying, illustrative drawings, wherein:

2

FIGURE 1 is a side elevational view of a body section of the blood filter;

FIGURE 2 is a side elevational view of some of the components of the filter in an intermediate stage of development;

FIGURE 3 is a fragmentary perspective view taken along line 3—3 of FIGURE 2;

FIGURE 4 is a view similar to that of FIGURE 1 showing another body section of the filter;

FIGURE 5 is a side elevational, fragmentary view of the filter of the present invention partially in vertical section and with parts broken away to show the filter in a further intermediate stage of development;

FIGURE 6 is a view in horizontal section taken along line 6—6 of FIGURE 5;

FIGURE 7 is an enlarged side elevational view, partly in cross-section, of the blood filter in its final stage of development;

FIGURE 8 is a view in vertical section taken along line 8—8 of FIGURE 7;

FIGURE 9 is a view in horizontal section taken along line 9—9 of FIGURE 7;

FIGURE 10 is an enlarged side elevational view of the blood filter of the present invention;

FIGURE 11 is a side elevational view of some of the parts representing an alternate embodiment of the present invention in an intermediate stage of development;

FIGURE 12 is a view in vertical section illustrating the formation by an injection molding process of some of the parts of the alternative embodiment of this invention;

FIGURE 13 is a view in horizontal section of the alternate embodiment;

FIGURE 14 is a front elevational view, partly in cross-section, of another embodiment of the filter of the invention;

FIGURE 15 is a side elevational view of the filter shown in FIGURE 14 of the illustrative drawings;

FIGURE 16 is a cross-sectional view taken along line 16—16 of FIGURE 14;

FIGURE 17 is a cross-sectional view taken along line 17—17 of FIGURE 14; and

FIGURE 18 is a fragmentary cross-sectional view of another embodiment of the filter of the invention showing a closed end of filter material formed by sealing longitudinal ends of a pair of sheet portions.

The method for forming a filter generally indicated at 9 is described in conjunction with reference to FIGURES 1 through 7. FIGURE 1 shows an interior view of a longitudinally extending body section 10. In the body section 10, channel portions 11 and 11a have the appearance of semicircular indentations. A semicircular inlet portion 12 and an outlet portion 13 communicate with the channel portions 11 and 11a at opposite ends of the body section 10. A central rib 14 is longitudinally formed in the body section 10 having its uppermost surface in the same plane as a marginal web 15 of the body section 10. The body section 10, in this instance, is formed of a transparent, semi-rigid, plasticized cellulose butyrate material.

A single sheet of nylon filter material 16 is folded into two sheet portions 19 and 20 which are disposed in face-to-face relationship and precut slightly oversize of the cross-sectional dimensions of the body section 10 and is trimmed after the filter 9 is formed. The folded filter material 16 is placed on the body section 10 with a closed, longitudinally folded end 17 positioned a short distance inwardly from the end thereof as best shown in FIGURE 2. Marginal edges 16a and 16b of the sheet portions 19 and 20 of the filter material 16 disposed on each side of a longitudinal central axis A—A of filter 40 overlies the marginal web 15. A generally central localized longitudinally extending portion 19a on the sheet portion 19 and a generally central localized longitudinally extending portion 20a on the sheet portion 20 overlie the rib 14. A tube 18 composed of a flexible plasticized polyvinylchloride material is positioned between the other longitudinal ends of the sheet portions 19 and 20 of the filter material 16 in the inlet portion 12 as best illustrated in FIGURE 3. A second tube 21, as best shown in FIGURE 5, is positioned in the outlet portion 13. Within tubes 18 and 21 are placed the ends of inlet and outlet tubes or conduits 22 and 23, respectively, which are composed of the same flexible material as the tubes 18 and 21.

Reference is made to FIGURE 4 illustrating the interior of a longitudinally extending body section 24 which is a duplicate of the body section 10. The body section 24 has similar longitudinally extending channel portions 25 and 25a with inlet and outlet portions 26 and 27, respectively. A generally central rib 28 is provided in the body section 24.

With the filter material 16 folded into sheet portions 19 and 20 and placed on the body section 10, as shown in FIGURE 2, and with the tubes 18 and 21 along with the tubes 22 and 23, respectively, placed in their previously described positions, the body section 24 is oriented in face-to-face relationship with the body section 10. The channel portions 11 and 11a and 25a and 25, respectively, are then in generally transverse alignment with respect to each other and face inwardly toward each other. The previously positioned parts are illustrated in FIGURES 5 and 6. Referring specifically to FIGURE 6, it will be seen that upon the previously described orientation, the marginal web 15 of the body section 10 is face-to-face with a corresponding marginal web 45 of the body section 24 and the rib 14 of the body section 10 is face-to-face with the rib 28 of the body section 24 with the filter material 16 sandwiched therebetween. Heat sealing dies shown in phantom include one pair of heated anvils 29 and 30 that extend completely around the periphery of the body sections 10 and 24. The dies are also provided with a second pair of heated anvils 31 and 32 that extend over the exterior of ribs 14 and 28, respectively. The dies have opposite recesses (not shown) to define a region of enlarged spacing at the points of insertion of the tube 18 and the inlet tube 22 and the tube 21 and the outlet tube 23. The marginal webs 15 and 45 each have longitudinally extending ribs 34 and 35. Also, two smaller ribs 36 and 37 are formed adjacent the inlet portion 12 while identical ribs 38 and 39 are formed adjacent the outlet portion 13. The purpose of ribs 34 to 39 is to give strength to and to stiffen the unitary filter 40 shown in its complete form in FIGURE 7.

During the sealing process, the filter material 16 is sealed in fluid-tight relationship between the tube 18 and the inlet portions 10 and 24 and the inlet tube 22 is simultaneously sealed in the tube 20. The outlet tube 23 is sealed in the tube 21 which is sealed in outlet portions 13 and 27.

The filter 40 is formed with the periphery being cut in an elongated ovular manner. When completed, and as illustrated in FIGURE 9, the filter 40 has two pairs of channels 41 and 42 extending longitudinally therethrough. The filter 40 is shown to have an inlet 1 and an outlet 0. The marginal edges 16a and 16b of the sheet portions 19 and 20 of the filter material 16 are sandwich-sealed by a fluid-tight seal between and to the marginal webs 15 and 45 and between and to the ribs 14 and 28. Somewhat ovular prefilter chambers PC1 and PC2 are defined by the somewhat spaced-apart sheet portions 19 and 20 between the marginal edges 16a and 16b and on each side of the localized longitudinally extending portions 19a and 20a. The channel portions 11, 11a, 25a and 25 join at their one end at a junction indicated at 44. The inlet tube 22 opens into the junction 44. The channel portions 11, 11a, 25a and 25 also join at their other ends at a junction 43. The junction 43 opens into the outlet tube 23.

As shown in FIGURE 10, the filter material 16 is sealed in a fluid-tight relationship along its entire length between webs 15 and 45. It will be also noted that channels 41 and 42 are of a tubular form. A pair of filtrate chambers FC1 and FC2 is defined by the space between the channel portions 11 and 25a and the sheet portions 19 and 20 and between the channel portions 11a and 25 and the sheet portions 19 and 20, respectively.

A method of forming an alternative embodiment of the present invention is described in conjunction with reference to FIGURES 11 to 13. The method for forming the filter 40A is substantially the same as that described in FIGURES 1 through 10. FIGURE 11 represents a body section 60 which is a duplication in configuration of the body section 10 shown in FIGURE 1. The body section 60 has longitudinally extending channel portions 61 and 61a separated longitudinally by a generally central rib 62 as best shown in FIGURE 13. In forming the modified filter 40A, a sheet of nylon filter material 63 is cut at a predetermined width and length and folded to form a pair of sheet portions 65 and 66 disposed in face-to-face relationship. A reinforcing rib 64 is injection molded between the sheet portions 65 and 66 of the filter material 63 in a longitudinal manner and at a point midway from marginal edges 63a and 63b of the sheet portions 65 and 66. A spacing ring 67 is also injection molded to the sheet portions 65 and 66 at the ends opposite a closed longitudinal folded end 68 and in alignment with the rib 64. The rib 64 is injection molded along the generally central longitudinally extending portions 65a and 66a of the sheet portions 65 and 66, respectively, by means of a pair of oppositely disposed die plates 69' and 70 with a blocking plate 71 separating the sheet portions 65 and 66 and forming a cavity in which rib 64 is formed as illustrated in FIGURE 12. The spacing ring 67 is formed in a similar manner. After the molding process, the filter material 63 is sealed by means of a suitable solvent along the marginal edges 63a and 63b and across the end opposite the closed folded end 68 with ring 67 therebetween. This forms in effect a pocket-like filter with ring 67 and rib 64 sealed therein. The pocket-like filter is placed over the body section 60 in such a manner that the reinforcing rib 64 is aligned with the rib 62 of the body section 60 and the ring 67 is aligned in the inlet portion 72 into which is placed the inlet tube 73. It will be observed that the inlet portion 72 is molded with a shoulder portion 74 to accommodate the ring 67 therein. The closed folded end 68 in the filter material 63 is positioned a short distance inwardly from the outlet portion 61a into which there is placed an outlet tube 76. A second body section 77, which is identical to the body section 60, has channel portions 77a and 77b oriented with and placed in face-to-face relationship with the channel portions 61 and 61a of the body section 60. The body sections 60 and 77 are electronically sealed in the manner described in forming the unitary filter 40 with the marginal edges 63a and 63b of the sheet portions 65 and 66 of the filter material 63 sandwiched-sealed betweed and to the marginal webs 69 and 78 and between the reinforcing rib 64 and the center ribs 62 and 79 of the body sections 60 and 77, respectively. A pair of prefilter chambers PC3 and PC4 are defined by the somewhat spaced-apart sheet portions 65 and 66 between marginal edge 63a and the rib 64 and between the rib 64 and the marginal edge 63b, respectively. A pair of filtrate chambers FC3 and FC4 are defined by the space between the channel portions 61 and 77a and the sheet portions 65 and 66 and between the channel portions 61a and 77b and the sheet portions 65 and 66. The filter 40A is shown to have an outlet generally indicated at 1' and an outlet generally indicated at 0'.

The method of using the filter 40 and the alternative filter 40A is substantially identical and the operation of both will be described in reference to the filter 40. The inlet tube 22 is attached to a source of blood. The blood can be forced through the filter 40 by a pump (not shown) or allowed to flow through the filter by gravity. The blood flows through the inlet tube 22 and between the sheet portions 19 and 20 of the filtering material 16 into the junction 44 and then into the prefilter chambers PC1 and PC2. As the blood flows in the direction of the outlet tube 23, it passes through the sheet portions 19 and 20 into the filter chambers FC1 and FC2, it is thereby filtered as best illustrated by reference to the arrows in FIGURE 9. Fibrins, clots and foreign matter are removed. The filtered blood then passes to the junction 43 and then it passes out through the outlet tube 23.

Reference is made to FIGURE 8 where it can be seen by means of the arrows that filtration is provided along the entire length of filter material 16. This provides a large area of filtration with the result that only a small volume of blood need be utilized. With the filtering material 16 sealed along its entire length at the marginal webs 15 and 45 and also between the ribs 14 and 28 ballooning of the filter material 16 is prevented. Because of this construction, blood at a high rate of flow can be passed through the filter 40 without tearing of the filter material 16 or contact being made between the filter material 16 and the insides of the channel portions 11 and 11a and 25a and 25. Such contact would interrupt blood flow. As previously described, the filter material 16 is folded to define a closed end 17. A single surface of filtering area is thereby provided throughout the filter affording the same uniform passage of blood at any one given area. This feature is most critical when the filter 40 is employed in a vertical manner.

As constructed according to the teachings of this invention, a filter 40 has been stressed to 400 mm. of mercury without collapsing. Subjected to 20 p.s.i. of internal pressure did not cause a leak.

The filter 40A affords the same advantages in use as those described for the filter 40. Referring to FIGURE 13, it will be seen that filtration is effected through the sheet portions 65 and 66 in the direction as indicated by the arrows. The reinforcing rib 64 maintains the sheet portions 65 and 66 in spaced relationship at the point of contact with ribs 62 and 79 of the body sections 60 and 77, respectively. Such spacing prevents contact between the sheet portions 65 and 66 and thereby eliminates any interruptions of flow.

It will thus be apparent that there is provided a blood filter having strength and providing a smooth passage of blood. The filter is employable in either a horizontal or vertical manner or if desirable can be placed in any position the user chooses. There is also provided a method of making the filter which is adaptable to large scale production which involves a minimum amount of time and effort.

In describing the construction of the filter 40, nylon filter material 16 has been described as being formed of a folded single sheet of material, the edges of which are sealed in the web 33, it is obvious that edges of the folded material can be pre-sealed laterally before placement between the body sections 10 and 24.

Referring now to the embodiment of FIGURES 14 through 17 of the illustrative drawings there is shown a filter generally indicated at 40B. The filter 40B is shown to have an opposed pair of longitudinally extending, face-to-face body sections generally indicated at 100 and 101, with the body section 100 having a channel portion 100a and a continuous marginal web 100b and with the body section 101 having a channel portion 101a and a continuous marginal web 101b. The body sections 100 and 101 are shown to have stiffening ribs $r$ and $r'$, respectively. The channel portions 100a and 101a are shown to extend in a longitudinal direction in general transverse alignment and are shown to be in substantially inwardly facing relationship with respect to each other, and the continuous marginal webs 100b and 101b are shown to be disposed in face-to-face relationship with respect to each other. The body section 100 is shown to have an arcuate inlet portion 102 and a arcuate outlet portion 103, while the body section 101 is shown to have an arcuate inlet portion 104 and an arcuate outlet portion 105. Filter material generally indicated at 106 is considered to have a pair of sheet portions 107 and 108 which are disposed in face-to-face relationship with respect to each other and which are formed in closed relationship at one longitudinal end 109 by folding. Marginal edges 110 and 111 of the sheet portions 107 and 108 are sandwiched between the marginal webs 100b and 101b and are sealed thereto, preferably electronically. Ribs 112, 112a, 113, 113a, 114 and 114a are formed in each of the marginal webs 100b and 101b of the body sections 100 and 101, respectively, during the sealing for the purpose of stiffening the filter 40B. The other longitudinal ends of the sheet portions 107 and 108 are sandwiched between the inlet portions 102 and 104 and an inlet tube 115 and are sealed thereto at the same time the webs 100b and 101b are sealed to the marginal edges 110 and 111 of the sheet portions 107 and 108. Correspondingly, an outlet tube 116 disposed between outlet portions 103 and 105 of the body sections 100 and 101 and is simultaneously sealed therein. Although it is preferred to electronically or heat seal the various components of the filter 40B, solvent sealing is also employable.

The inlet tube 115 leads directly into a prefilter chamber PC5 defined by the insides of the somewhat spaced-apart sheet portions 107 and 108 of the filter material 106. When the blood passes through the filter material 106, it passes into a filtrate chamber FC5 defined by the outsides of the sheet portions 107 and 108 between the marginal edges 110 and 111 and the channel portions 100a and 101a of the body sections 100 and 101, respectively. The closed, longitudinal end 109 is shown to terminate somewhat short of a lower end 117 of the filtrate chamber FC5. The filter 40B is shown to have an inlet generally indicated at $1''$ and an outlet generally indicated at $0''$.

Referring now to the embodiment of FIGURE 18 of the illustrative drawings, there is shown a fragmentary portion of a filter generally indicated at 40C which is identical to the embodiment of FIGURES 14 through 17 of the illustrative drawings except for the manner in which a longitudinal end 109' is formed in closed relationship. The filter 40C has body sections generally indicated at 100' and 101' having arcuate channel portions 100a' and 101a'. Filter material 106' is shown to have a pair of sheet portions 107' and 108' which are brought into closed relationship at one longitudinal end 109' by a transverse fluid-tight seal preferably accomplished by solvent sealing.

In the embodiments of the invention, with the exception of the embodiment of FIGURES 11 through 13 of the illustrative drawings, the sheet portions of the filter material are loosely disposed in face-to-face relationship with respect to each other. When the liquid for example blood to be filtered rushes into the prefilter chamber defined by the face-to-face sheet portions of filter material, the filter material will "balloon" to the extent that the volume of the prefilter chamber and the filtrate chamber are about equal, with each sheet portion remaining spaced from its adjacent passage portion. In the embodiment of FIGURES 11 through 13, the sheet portions 65 and 66 are necessarily somewhat less loosely disposed between the body sections 60 and 77 because the sheet portions 65 and 66 are already spaced apart by the rib 64.

The body sections 10 and 24, 60 and 77, 100 and 101, and 100' and 101' are preferably composed of a semi-rigid plasticized cellulose butyrate. It should be understood that other fairly rigid plastic materials such as polyvinylchloride, styrene or nylon are also employable without departing from the spirit and scope of this invention. The body sections 10 and 24, 60 and 77, 100 and 101, and 100' and 101' can be vacuum or injection molded depending upon the plastic material employed. The inlet and outlet tubes 22 and 23, the tubes 20 and 21 and the inlet and outlet tubes 73 and 76 and the inlet and outlet tubes 115 and 116 are formable of a flexible plastic or natural material such as polyethylene or rubber. The filter material 16, 63, 106 and 106' is composable of mesh material comprised of polyvlinylidene chloride and polyvinylchloride resins commonly known as Saran, instead of the preferred nylon mesh of all the embodiments.

The above-described embodiments and method being exemplary only, it is to be understood that various modifications in form, detail or prodecure are within the spirit and scope of the invention. Accordingly, the invention is not to be considered as limited save as is consonant with the scope of the following claims.

What is claimed is:

1. In a filter: a pair of longitudinally extending body sections disposed in face-to-face relationship with respect to each other, each body section having a marginal web, each body section having a pair of inwardly facing, longitudinally extending channel portions providing communication with each other at their longitudinal ends and spaced from each other by a generally central longitudinally extending rib, said channel portions of one body section being in generally transverse alignment with said channel portions in the other body section, and two longitudinally extending face-to-face sheet portions of filter material in closed relationship at one end, said marginal edges and said marginal webs being joined in fluid-tight relationship, said ribs and a generally central localized longitudinally extending portion of each of said sheet portions being joined in fluid-tight relationship, said sheet portions being spaced apart inwardly of said marginal edges on each side of said localized portions to define a pair of prefiltrate chambers, said sheet portions being spaced from their adjacent channel portions to define a pair of filtrate chambers, inlet means sealingly extending through at least one of said body sections and between said pair of sheet members and outlet means sealingly extending through at least one of said body sections and into one of said filtrate chambers.

2. In a filter: a pair of longitudinally extending body sections disposed in face-to-face relationship with respect to each other, each body section having a marginal web, each body section having a pair of inwardly facing, longitudinally extending, channel portions providing communication with each other at their longitudinal ends and spaced from each other by a generally central longitudinally extending rib, said channel portions of one body section being in generally transverse alignment with said channel portions in the other body section, two longitudinally extending face-to-face sheet portions of filter material in closed relationship at one end, said sheet portions having marginal edges sandwiched between said marginal webs, said marginal edges and said marginal webs being joined in fluid-tight relationship, said ribs and a generally central localized longitudinally extending portion of each of said sheet portions being joined in fluid-tight relationship, said sheet portions being spaced apart between said marginal edges and said localized portions to define a pair of prefilter chambers, said sheet portions being spaced from their adjacent channel portions to define a pair of filtrate chambers, inlet means sealingly extending through at least one of said body sections and between said pair of sheet members and outlet means sealingly extending through at least one of said body sections and into one of said filtrate chambers, and means for stiffening said marginal webs.

3. In a filter: a pair of longitudinally extending body sections disposed in face-to-face relationship with respect to each other, each body section having a marginal web, each body section having a pair of inwardly facing, longitudinally extending, channel portions providing communication with each other at their longitudinal ends and spaced from each other by a longitudinally extending rib, said channel portions of one body section being in generally transverse alignment with said channel portions in the other body section, two longitudinally extending face-to-face sheet portions of filter material in closed relationship at one end, said sheet portions having marginal edges sandwiched between said marginal webs, a generally central localized longitudinally extending portion along each of said sheet portions, a longitudinally extending rib disposed between said localized portions, said marginal edges and said marginal webs being joined in fluid-tight relationship; said ribs, said localized portions, and said rib being joined in fluid-tight relationship; said sheet portions being spaced apart inwardly of said marginal edges on each side of said localized portions to define a pair of prefilter chambers, said sheet portions being spaced from their adjacent channel portions to define a pair of filtrate chambers, inlet means sealingly extending through at least one of said body sections and between said pair of sheet members and outlet means sealingly extending through at least one of said body sections and into one of said filtrate chambers.

4. A filter for the extracorporeal filtration of parenteral fluids comprising: a pair of semi-rigid, longitudinally extending body sections disposed in face-to-face relationship with respect to each other, each body section having a pair of opposed longitudinally extending marginal webs and at least one concave-outward, longitudinally extending, channel-forming wall, said walls being in generally transverse alignment with each other, and two longitudinally extending face-to-face sheet portions of filter material in closed relationship at one end, said sheet portions having opposed longitudinally extending marginal edges sealingly sandwiched between respective aligned pairs of said marginal webs, said sheet portions being so fastened at said marginal edges that they are displaceable relative to each other, but whereby said sheet portions are spaced from said walls at their maximum displacement, said marginal edges and said marginal webs being joined in fluid-tight relationship, said sheet portions being free inward of said marginal edges to define a prefilter chamber, the space between said sheet portions and the adjacent walls defining a filtrate chamber, inlet means sealingly extending through at least one of said body sections and between said pair of sheet members and outlet means sealingly extending through at least one of said body sections and into said filtrate chamber.

5. A filter for the extracorporeal filtration of parenteral fluids comprising: a pair of semi-rigid, longitudinally extending body sections disposed in face-to-face relationship with each other, each body section having a marginal web and a pair of concave outward, longitudinally extending channel-defining wall sections providing communication with each other at their longitudinal ends and spaced from each other by a generally central longitudinally and inwardy extending rib, said wall sections of one body section being in generally transverse alignment with said wall sections of said other body section, and two longitudinally extending face-to-face sheet portions of filter material in closed relationship at one end and having marginal edges, said marginal edges and said webs being joined in fluid-tight relationship, said rib and a generally central localized longitudinally extending portion of each of said sheet portions being joined in fluid-tight relationship, said sheet portion being so fastened at said marginal edges and said rib that they are displaceable relative to each other, but whereby said sheet portions are spaced from said wall sections at their maximum displacement, said sheet portions defining a pair of prefiltrate chambers therebetween, each sheet portion and corresponding wall section defining a pair of filtrate chambers therebetween, inlet means sealingly extending through at least one of said body sections and between said pair of sheet members and outlet means sealingly extending through at least one of said body sections and into one of said filtrate chambers.

References Cited by the Examiner

UNITED STATES PATENTS

| | | | |
|---|---|---|---|
| 799,417 | 9/1905 | Thompson | 210—229 |
| 1,351,561 | 8/1920 | Farnsworth | 55—382 X |
| 1,790,036 | 1/1931 | Wiltse | 210—499 X |
| 2,341,114 | 2/1944 | Novak | 210—448 X |
| 2,704,544 | 3/1955 | Ryan | 210—448 X |
| 2,765,923 | 10/1956 | Novak | 210—446 X |
| 2,901,112 | 8/1959 | Naftulin et al. | 210—446 X |
| 2,914,181 | 11/1959 | Naftulin et al. | 210—446 |

REUBEN FRIEDMAN, *Primary Examiner.*

HARRY B. THORNTON, *Examiner.*